United States Patent
Dinu

(10) Patent No.: US 12,552,554 B2
(45) Date of Patent: Feb. 17, 2026

(54) CONTROL SYSTEM

(71) Applicant: Hamilton Sundstrand Corporation, Charlotte, NC (US)

(72) Inventor: Andrei Dinu, Leicester (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 282 days.

(21) Appl. No.: 18/508,728

(22) Filed: Nov. 14, 2023

(65) Prior Publication Data
US 2024/0166377 A1    May 23, 2024

(30) Foreign Application Priority Data
Nov. 23, 2022    (EP) .................................. 22209219

(51) Int. Cl.
*B64G 1/24*    (2006.01)
*B64G 1/58*    (2006.01)

(52) U.S. Cl.
CPC ............. *B64G 1/244* (2019.05); *B64G 1/58* (2013.01)

(58) Field of Classification Search
CPC .......... B64G 1/546; B64G 1/244; B64G 1/58; G05D 1/87; G05D 2107/38; G05D 2109/40; G06F 11/184; G06F 11/185
See application file for complete search history.

(56) References Cited

U.S. PATENT DOCUMENTS

| | | | |
|---|---|---|---|
| 4,583,224 A * | 4/1986 | Ishii ......................... | H04L 1/22 714/10 |
| 4,745,542 A * | 5/1988 | Baba .................. | G06F 11/0796 714/24 |
| 6,298,289 B1 * | 10/2001 | Lloyd .................... | B64G 1/283 701/13 |
| 6,954,875 B2 | 10/2005 | Liu | |
| 7,877,627 B1 | 1/2011 | Freydel | |
| 10,550,951 B2 | 2/2020 | Gundlach et al. | |

(Continued)

OTHER PUBLICATIONS

Kerns; "The Design of Radiation-Hardened ICs for Space: A Compendium of Approaches"; Proceedings of the IEEE vol. 76, No. 11; pp. 1470-1509; 1988 (Year: 1988).*

(Continued)

*Primary Examiner* — Stephen Holwerda
(74) *Attorney, Agent, or Firm* — CANTOR COLBURN LLP

(57) ABSTRACT

A control system for an aerospace vehicle includes a voter and a plurality of control blocks. Each control block includes: a controller configured to receive an input signal and perform a control algorithm that includes an integral function on the input signal to provide an output signal; and a feedback controller that is configured to: receive the output signal from the controller, a reference signal from an external controller, and a plant feedback signal from an external plant; perform a feedback algorithm on the output signal to provide an feedback control signal; and perform a combinator algorithm using the reference signal, the plant feedback signal and the feedback control signal to provide the input signal to the controller; wherein the voter is configured to receive the output signals and perform a voting algorithm on the output signals to determine a control signal to provide to the external plant.

15 Claims, 5 Drawing Sheets

(56) References Cited

U.S. PATENT DOCUMENTS

| | | | | |
|---|---|---|---|---|
| 2002/0027878 A1* | 3/2002 | McDermott | .......... | G06F 11/182 |
| | | | | 714/1 |
| 2010/0222900 A1* | 9/2010 | Kakino | .................... | G05B 9/03 |
| | | | | 700/82 |
| 2013/0141952 A1* | 6/2013 | Kaneko | ................. | H02M 7/537 |
| | | | | 363/72 |

OTHER PUBLICATIONS

Sunderland; "Designing Electronic Systems for Space"; 2008 IEEE Bipolar/BiCMOS Circuits and Technology Meeting; pp. 171-177; 2008 (Year: 2008).*

European Search Report for Application No. 22209219.9, mailed May 12, 2023, 6 pages.

Johnson, et al. "Voter Insertion Algorithms for FPGA Designs Using Triple Modular Redundancy", Field Programmable Gate Arrays (FPGA'10), Feb. 21-23, 2010, pp. 249-258.

Keller, et al. "Benefits of Complementary SEU Mitigation for the LEON3 Soft Processor on SRAM-Based FPGAs", IEEE Transactions on Nuclear Science, vol. 64, No. 1, Jan. 2017, pp. 519-528.

Rui, et al. "A Method of Synchronous-feedback Based State Machine with Triple Modular Redundancy" Proceedings of 2014 IEEE Chinese Guidance, Navigation and Control Conference, Aug. 8-10, 2014, Yantai, China, pp. 136-139.

* cited by examiner

CONTROL SYSTEM

CROSS REFERENCE TO RELATED APPLICATIONS

This application claims priority to European Patent Application No. 22209219.9 filed Nov. 23, 2022, the entire contents of which is incorporated herein by reference.

FIELD OF THE INVENTION

This application relates to a control system for an aerospace vehicle, a multi-stage control system for an aerospace vehicle, an aerospace vehicle and a method of controlling an aerospace vehicle.

BACKGROUND

An aerospace vehicle may operate in an environment which has an amount of radiation higher than what is typically found at ground level, for example ionising radiation such as cosmic rays and atmospheric neutrons. Such radiation may be found, for example, at an altitude equal to or above the stratosphere, or at a latitude close to the North or South pole of the Earth. When an aerospace vehicle enters such an environment, the radiation may interfere with electronic circuitry associated with the aerospace vehicle's control system. As a result, the radiation may affect the operation of the control system. A common technique to address this problem is to use a modular redundancy control system. There remains scope for improvements in providing control systems that are capable of reliably operating in such environments.

SUMMARY

In a first aspect, there is provided a control system for an aerospace vehicle, the control system comprising a voter and a plurality of control blocks. Each of the control blocks comprises a controller configured to receive an input signal and perform a control algorithm comprising an integral function on the input signal to provide an output signal; and a feedback controller. The feedback controller is configured to receive the output signal from the controller, a reference signal from an external controller, and a plant feedback signal from an external plant; perform a feedback algorithm on the output signal to provide an feedback control signal; and perform a combinator algorithm using the reference signal, the plant feedback signal and the feedback control signal to provide the input signal to the controller. The voter is configured to receive the output signals and perform a voting algorithm on the output signals to determine a control signal to provide to the external plant.

When a control system is in an environment that has a higher level of ionising radiation when compared to ground level, the radiation may cause an error (for example, a single event effect (SEE) such as a single event upset (SEU)) in one of the plurality of control blocks. In particular, memory bits associated with the integral function are particularly susceptible to a memory bit changing state due to an SEE. As a result, in a conventional control system with an integral function, an error in an individual control block is not corrected and the respective control block will continuously output a faulty output signal. In this scenario, the voter would use a voting algorithm which ensures only a correct output signal is provided to the external plant, and therefore the plant feedback signal provided to the control blocks will be correct. Thus conventionally, each individual control block would be unable to identify that it's respective output is faulty.

By providing a feedback controller configured to receive an output of the controller as well as a reference signal and a plant feedback signal, the control system of the present invention is able to correct an error in the control block and return the operation of the respective control block to normal, without effecting the control output signal of the control system. This advantageously allows the control system to operate correctly and continuously in an environment wherein the control system is exposed to a certain level of radiation, because there is no need to reset the control system in order to correct the error. Furthermore, the present invention is able to correct the error without requiring any down time. This is particularly advantageous for applications that are critical to the operation of an aerospace vehicle system.

Furthermore, because the present invention is able to correct an error in the control block and return the operation of the respective control block to normal, the operating capabilities of the control system are greatly improved. As a result, the present invention is able to achieve a level of redundancy, for example to meet a particular certification or regulatory standard, whilst using relatively less system resources (for example, the amount of silicon required in a microprocessor, power consumption etc.) when compared to conventional control systems. The present invention thus provides a control system that can meet regulatory standards whilst being more cost effective and energy efficient. This is particularly advantageous in aerospace applications, wherein system resources may be particularly limited.

In some examples the combinator algorithm comprises subtracting the feedback control signal and the plant feedback signal from the reference signal. This combinator algorithm ensures that, in the event that the plant feedback signal approximately equals the reference signal, but the output signal from the controller is faulty, the feedback control signal would be combined with the input signal and plant feedback signal in a manner that would cause the controller to re-align it's output to correct the fault.

In some examples the control algorithm further comprises a proportional and/or derivative function.

In some examples the feedback algorithm further comprises a proportional function. Using a proportional function in the feedback algorithm is an effective way of determining an feedback control signal that can be used by the combinator to reduce the error.

In some examples the feedback algorithm further comprises a gain function. By applying a gain function to the feedback control signal, the magnitude of the feedback control signal can be controlled by tuning the gain function, which in turn determines the period of time for a faulty output to be corrected, with a faulty output being cleared more quickly with increasing magnitude of the gain function. However, there is a steady state error associated with the magnitude of the gain function, with steady state error increasing with the magnitude of the gain function. Accordingly, the gain function advantageously allows the system designer to select a steady state error and a fault clearing time, each of which fall within the operating limits of the system.

In some examples the feedback controller comprises a feedback processor configured to perform the feedback algorithm.

In some examples the feedback controller comprises a combinator configured to perform the combinator algorithm.

In some examples the plurality of control blocks comprise three control blocks. Using three control blocks provides a robust level of redundancy without requiring an extensive amount of resources.

In some examples the plurality of control blocks comprise five control blocks. Using five control blocks provides an extremely robust level of redundancy, which is useful in applications where there will be limited or no access for replacement or repairs or down time, such as in space vehicles. In some examples the plurality of control blocks comprises four or six control blocks.

In some examples the voting algorithm comprises determining if any one of the output signals varies from the other output signals by a value greater than a predetermined difference threshold, and if a determination is made then identifying the respective output signal as a different output signal; and disregarding any different output signals. By disregarding different output signals, a faulty output signal can be identified and prevented from propagating through the control system and causing harm to the operation of the control system. A faulty output signal will thus not propagate any further than the first voter to which it is connected.

In some examples the voting algorithm further comprises selecting any one of the signals that are not disregarded as the control signal. This is advantageous in a case where the voter is receiving one faulty output signal. The voter will recognise the faulty output signal and select a non-faulty output signal as the control signal.

In some examples the voting algorithm comprises determining an arithmetic average of all of the output signals and selecting the arithmetic average as the control signal.

In some examples the voting algorithm further comprises determining an arithmetic average of all of the signals that are not disregarded and selecting the arithmetic average as the control signal. In a scenario where consecutive SEUs are received, the voter may receive a correct output signal, a faulty output signal, and an output signal which is in the process of being corrected by converging to the correct output signal. In this case it is advantageous to take an average of the output signals and select the arithmetic average as the control signal to prevent the voter having to determine which of the output signals is correct. Advantageously, the arithmetic average is closer to the correct output signal than the converging output signal. The voter is thus able to provide a control signal which is substantially close to the correct output signal in the event of consecutive SEUs being received. This may be particularly beneficial in a system comprising three control blocks.

In some examples the voting algorithm comprises determining a weighting for each of the output signals, wherein the weighting is a measure of the difference between the respective output signal and the remaining output signals; scaling each of the output signals by their respective weighting to determine a scaled output signal for each of the output signals; determining an arithmetic average of the scaled output signals; and selecting the arithmetic average as the control signal. This is particularly advantageous in a scenario wherein there are three or more control blocks, because the weighting for each output signal will differentiate the faulty output signal from the correct output signals. This enables the voter to provide a control signal which is substantially very close to the correct output signal, even in the event of consecutive SEUs being received.

In a second aspect there is provided a multi-stage control system for controlling a plant of an aerospace vehicle, the multi-stage control system comprising a first and a second control system according the first aspect. The first control system is configured to control a first parameter of the plant, and the second control system is configured to control a second parameter of the plant. The control signal provided by the first control system is the reference signal provided to the second control system. The first control system has a first plant feedback signal which is related to the first parameter of the plant; and the second control system has a second plant feedback signal which is related to the second parameter of the plant.

The multi-stage control system is advantageous in applications which require more than one control parameter to achieve effective control.

In some examples the control system further comprises a plurality of voters equal to the number of control blocks; and an additional voter, wherein the additional voter is configured to receive the control signal output from the plurality of voters, and perform the voting algorithm on the control signals to provide a final control signal to the external plant. Using additional voters will further increase the level of redundancy and therefore improve the reliability of the overall control system. Using a plurality of control blocks and a plurality of voters, triple modular redundancy (TMR), or an even greater level of redundancy, can be achieved.

In a third aspect there is provided an aerospace vehicle comprising a plant; a controller; and the control system of the first aspect or the second aspect.

In some examples the plant is an actuator for any one of: an aileron, a rudder, a flap or an external control surface. In some examples the plant is a heater for an internal heating system, an external heating system, a de-icing system. In some examples the plant is a motor, e.g. for a compressor or a pump. The plant in these examples may be critical to the operation of the aerospace vehicle. As a result, the control system of the first aspect or the multi-stage control system of the second aspect are an effective and reliable way of controlling the plant of these examples.

In a fourth aspect, there is provided a method of controlling an aerospace vehicle using a control system comprising a plurality of control blocks and a voter. The method comprises providing a reference signal from an external controller to each of the control blocks; providing a plant feedback signal from an external plant to each of the control blocks; performing in the control block: a control algorithm comprising an integral function on an input signal to provide an output signal; a feedback algorithm on the output signal to provide an feedback control signal; and a combinator algorithm using the reference signal, the plant feedback signal and the feedback control signal to provide the input signal. The method further comprises the voter receiving the output signals and performing a voting algorithm on the output signals to determine a control signal to provide to the external plant.

In a fifth aspect, there is provided a circuit configured to implement the control system of the first or second aspect, or the method of the fourth aspect.

In some examples the circuit comprises a field-programmable gate array (FPGA).

The control system of the second aspect, the aerospace vehicle of the third aspect, and the circuit of the fifth aspect may each comprise any of the features of the examples described with respect to the first aspect. The method of the fourth aspect may include any functional steps described in relation to the examples of the first and second aspects.

BRIEF DESCRIPTION OF THE DRAWINGS

Various examples will now be described with reference to the accompanying drawings in which.

DETAILED DESCRIPTION

Figure 1:
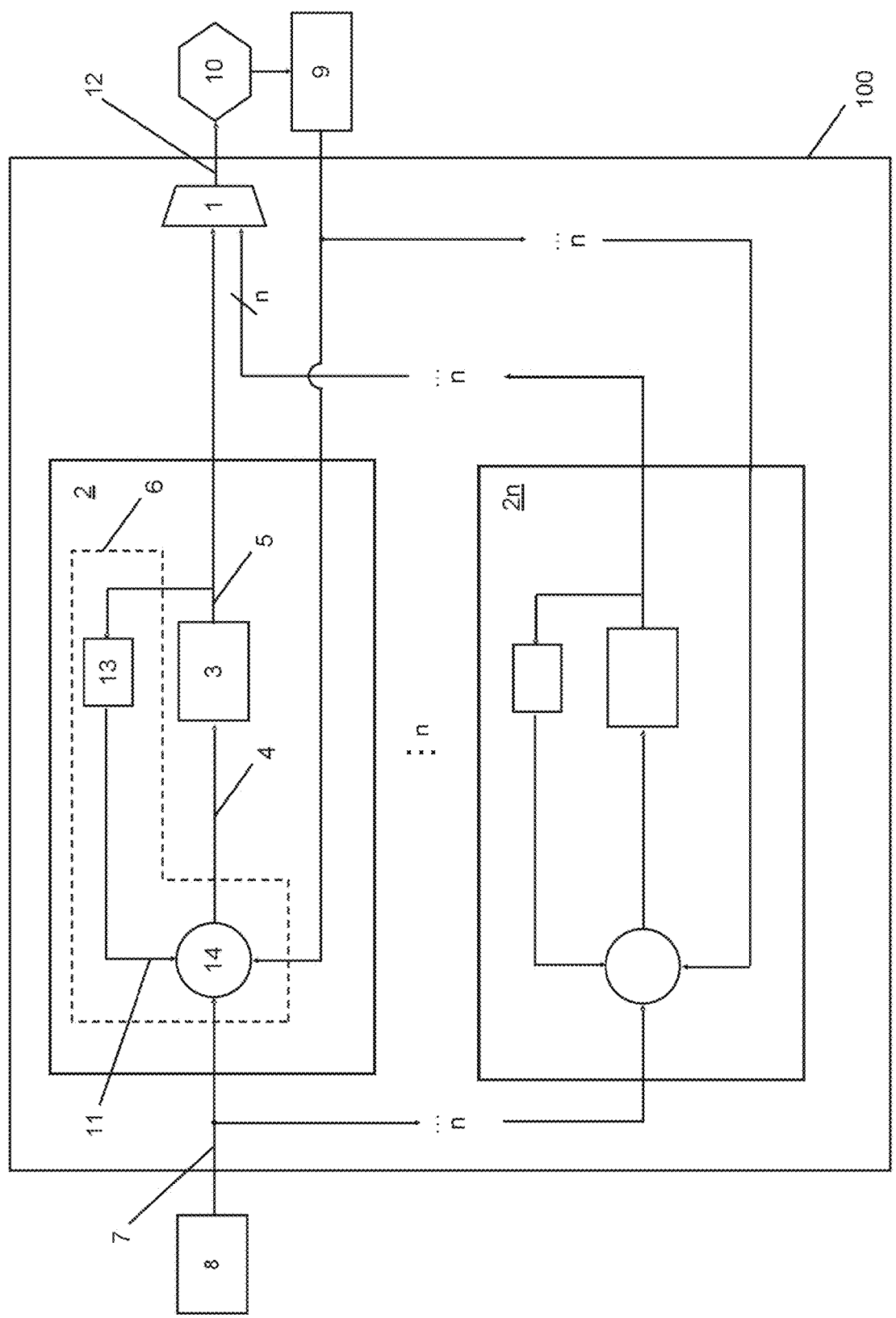
FIG. 1 shows an example of the invention including the feedback controller and the plurality of control blocks.

With reference to FIG. 1, a control system 100 comprises a voter 1 and a plurality of control blocks 2, 2n (e.g. three or more control blocks). The control system 100 receives a reference signal 7 from an external controller 8, and a plant feedback signal 9 from an external plant 10. The control system 100 is configured to use the reference signal 7 and the plant feedback signal 9 to provide a control signal 12 to control the plant 10. Thus, the control system 100 forms a closed-loop control system.

As illustrated in FIG. 1, the control system 100 comprises a plurality of control blocks 2n. Each of the plurality of control blocks 2n are the same as the control block 2.

The control block 2 comprises a controller 3 and a feedback controller 6. The controller 3 receives an input signal 4 and performs a control algorithm, described in more detail below, to provide an output signal 5. The output signal 5 is provided to the voter 1. The control algorithm includes an integral function.

The feedback controller 6 comprises a feedback processor 13 and a combinator 14. The feedback processor 13 receives the output signal 5 from the controller 3 and performs a feedback algorithm to provide an feedback control signal 11. The combinator 14 receives the feedback control signal 11, the plant feedback signal 9 and the reference signal 7, and performs a combinator algorithm to provide the input signal 4 to the controller 3. The feedback algorithm and the combinator algorithm are described in more detail below.

The voter 1 receives the output signal 5 from the plurality of control blocks 2, 2n. The voter performs a voting algorithm, described in more detail below, to provide the control signal 12 to the external plant 10.

Figure 2:
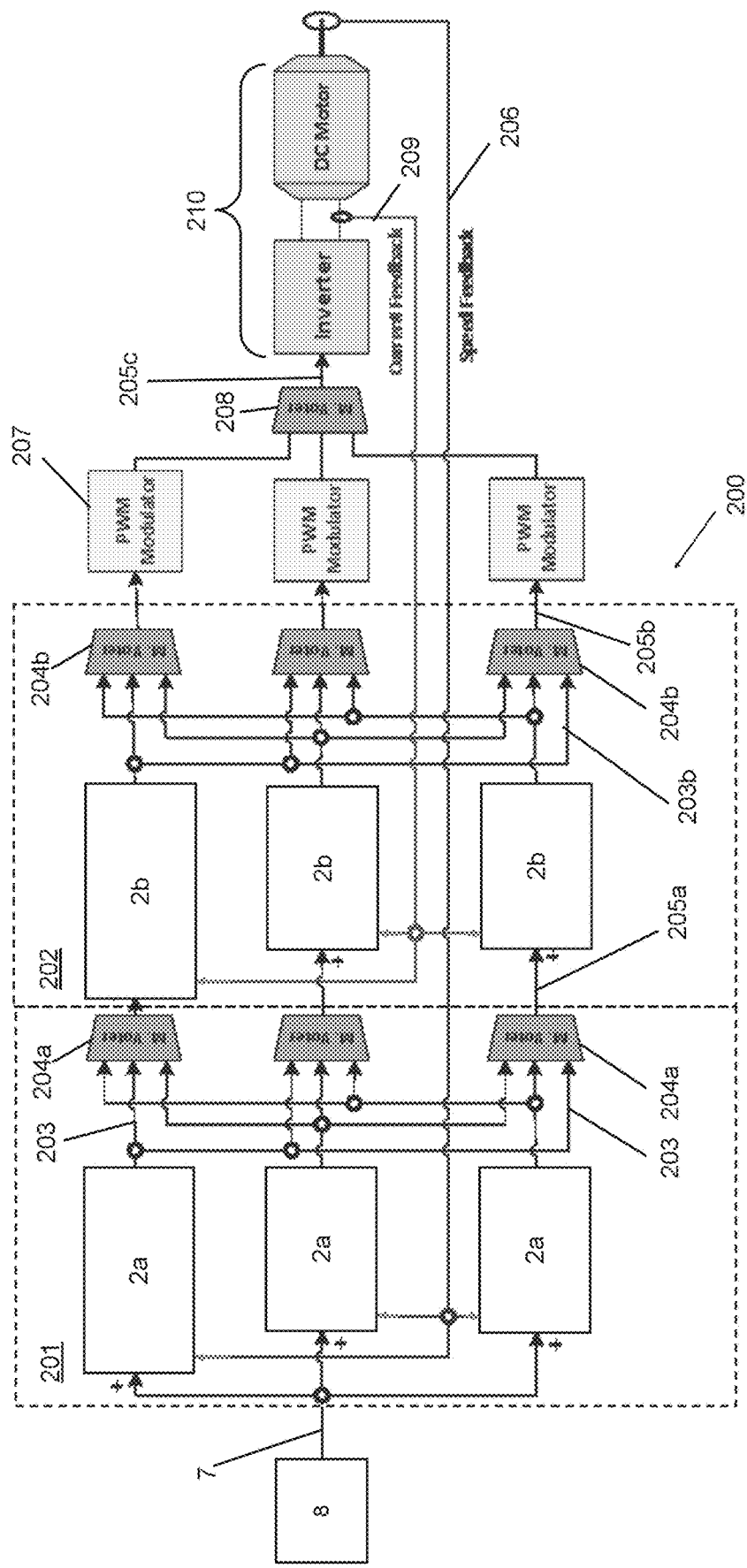
FIG. 2 shown an example of the invention including a multi-stage triple redundancy control system.

In an embodiment of the invention, a multi-stage control system 200 with triple redundancy is shown in FIG. 2. The control system 200 comprises a first control system 201, a second control system 202, further processing blocks 207, and an additional voter 208. The control system 200 is configured to control an external plant 210 based on a refence signal 7 provided by an external controller 8. The control system 200 is configured to receive a first plant feedback signal 206 which corresponds to a first plant parameter, and a second plant feedback signal 209 which corresponds to a second plant parameter. In FIG. 2, repeated reference numerals are omitted for clarity.

The first control system 201 and the second control system 202 each comprise a plurality of control blocks 2a, 2b and a plurality of voters 204a, 204b. Each of the control blocks 2a, 2b and the voters 204a, 204b are identical to the control block 2 and the voter 1 described above respectively.

In the first control system 201, the control blocks 2a receive the reference signal 7 and the first plant feedback signal 206, and provide an output signal 203 to the plurality of voters 204a. The output signal 203 is equivalent to the output signal 5 described above however because there is a plurality of voters 204a, the output signal 203 is triplicated. The plurality of voters 204a perform a voting algorithm, as described below, to provide a plurality of control signals 205a. The plurality of control signals 205a are provided to the second control system 202.

In the second control system 202 the control signals 205a are provided to the control blocks 2b in place of the reference signal 7. The control blocks 2b receive the control signals 205a and the second plant feedback signal 209, and output a plurality of second output signal 203b to the plurality of voters 204b. The plurality of voters 204b perform a voting algorithm, as described below, to provide a plurality of second control signals 205b. The plurality of second control signals 205b are provided to the additional voter 208. The plurality of second control signals 205b may be provided to the further processing blocks 207 for further processing, before being provided to the additional voter 208.

The additional voter receives the second control signals 205b and performs a voting algorithm, as described below, to provide the final control signal 205c to the external plant 210.

Thus, the first control system 201 forms a closed-loop control system between the reference signal 7, the plant 210 and the first plant feedback signal 206. The second control system 202 forms a second closed-loop control system between the first control signal 205a, the plant 210 and the second plant feedback signal 209. In this manner, the control system 200 is a multi-stage control system.

The example of FIG. 2 illustrates three parallel control blocks 2a, 2b each with a corresponding voter 204a, 204b. This arrangement forms a triple modular redundancy (TMR) control system 200.

The example shown in FIG. 1 and described above can be adapted to include the TMR shown in FIG. 2, by including a plurality of voters as described above. Furthermore, the arrangement of FIG. 2 can be extended to cover an n number of redundancies, where n is the number of control blocks as shown in FIG. 1. For example, five levels of redundancy could be achieved by including 5 control blocks 2, 2n with the control system comprising a voter for each control block, and an additional voter.

The multi-stage control system 200 described in relation to FIG. 2 above is a two stage control system. However, this can be extended to a plurality of stages, wherein the control signal output from one control system is the reference signal provided to the subsequent control system, and each control system receives a plant feedback signal which corresponds to a different parameter of the plant.

The skilled person would understand that the embodiments disclosed in FIG. 1 and FIG. 2 are but examples. In particular, the features of a TMR control system and/or a multi-stage control system can be implemented on FIG. 1, and the features of a plurality of n control blocks can be implemented on FIG. 2.

Referring to FIG. 1, in an exemplary embodiment of the invention, in a normal operating condition the external controller 8 provides a reference signal 7 to the control system 100. The reference signal 7 includes information of a desired configuration of the plant 10. In this example, the reference signal 7 includes a desired speed (in rad/sec), and the external plant 10 is a motor.

The reference signal 7 is provided to the plurality of control blocks 2. The combinator 14, which is part of the feedback controller 6, receives the reference signal 7 and performs the combinator algorithm to provide the input signal 4. The combinator algorithm includes subtracting the plant feedback signal 9 and the feedback control signal 11 from the reference signal 7 (i.e. input signal=reference signal−plant feedback signal−feedback control signal). In a start-up or reset condition the plant feedback signal 9 and the feedback control signal 11 may be zero.

The input signal 4 is provided to the controller 3 which performs a control algorithm. The control algorithm includes a proportional (P), an integral (I), and a derivative (D) function. The controller 3 thus performs a PID function on the input signal 4 to provide the output signal 5.

The output signal 5 is provided by each control block 2, 2n to the voter 1 which performs a voting algorithm to provide a control signal 12 to the plant 10. In the normal operating condition each of the output signals 5 provided by the control blocks 2, 2n are substantially identical. Thus, the voter 1 provides a control signal 12 which is substantially the same as each of the output signals 5 provided by the plurality of control blocks 2, 2n. The plant 10 configures itself based on the control signal 12. Thus, the plant 10 is configured by the controller 3 accordingly.

The plant feedback signal 9 provides information on the current configuration of the plant 10 to the control system 100. Thus, the control block 2, by combining the plant feedback signal 9 with the refence signal 7, determines an error/difference between the plant's current configuration and the reference signal's desired configuration, and adjusts the output signal 5 appropriately. This process continues until the plant 10 is in the desired configuration provided by the reference signal 7. These features of the invention would form a conventional closed-loop feedback system, with an n number of redundancies where n is the number of control blocks.

The feedback controller 6 comprises the feedback processor 13, which receives the output signal 5 and performs the feedback algorithm to provide the feedback control signal 11. The feedback algorithm includes a proportional function (also referred to as a "gain function"). The following equation may be used for the feedback algorithm, where f is the feedback control signal, z is the output signal 5 provided to the feedback processor 13, and K is the gain.

$$f = Kz \qquad \text{Equation 1}$$

The proportional function makes the feedback control signal 11 proportional to the output signal 5. The gain is set to reduce the magnitude of the feedback control signal 11. Thus, the feedback control signal 11 is proportional to the output signal 5, but is scaled to have a lower magnitude compared to the output signal 5.

In some examples, the gain is a value of 0.05 radians per second per Amp. In this example the unit of the gain is derived from the unit of the speed divided by the unit of the current. This is because the current demand at the output of the controller 3 is converted into a speed discharge term at the input of the controller 3. In this example the gain is 0.05 radians per second for each Amp of current demand.

In another example, the gain can be defined in revolutions per minute (rpm). For example, the gain may be 0.5 rpm for each Amp of current demand.

Because the combinator algorithm subtracts the feedback control signal 11 from the reference signal 7 (in addition to subtracting the plant feedback signal 9), the input signal 4 will always be lower than the reference signal 7 even in a steady state condition. Thus, in the normal operating condition, there will be a steady state error associated with the output signal 5 as a result of the feedback control signal 11. The magnitude of the steady state error will be proportional to the gain of the feedback algorithm.

Figure 3:
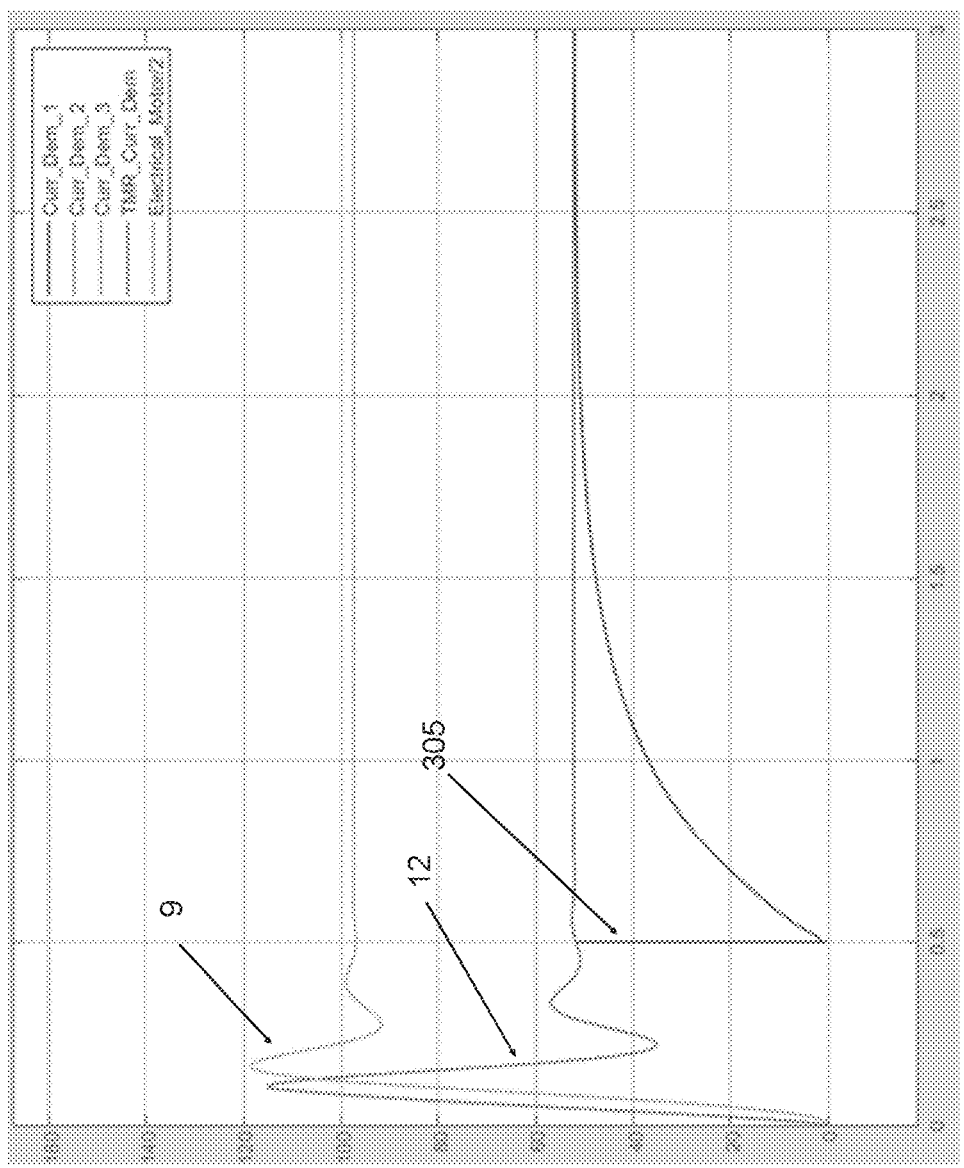
FIG. 3 is a plot showing the effect of an SEU on a control system of the present invention.

A start-up scenario in a normal operating condition can be seen in the first 0.5 seconds of the plot depicted in FIG. 3. The control signal 12 and each of the output signals 5 are identical and are thus superimposed on one another. The plant feedback signal 9 depicts the current through the motor. As can be seen, the plant feedback signal 9 settles at a value just under 100 rad/sec. In this example, the reference signal 7 is set to configure the plant 10 to 100 rad/sec, but the gain in the feedback algorithm causes the control signal 12 to configure the plant 10 to just under 100 rad/sec. This error is acceptable considering the operating requirements of the system.

With continued reference to FIG. 1 and FIG. 3, and in an example where the plurality of control blocks 2, 2n is three blocks, a fault occurs at 0.5 seconds in one of the controllers 3. The error may be an SEE (e.g. an SEU) which occurs as a result of ionising radiation which alters a memory bit within a controller 3. The altered memory bit is processed by the controller 3, and thus the controller 3 outputs a faulty output signal 305. The remaining controllers 3 continue to provide a correct output signal 5. The faulty output signal 305 can be seen in FIG. 3 at 0.5 seconds as the waveform moves to 0.

Although this example uses 0 as the faulty output signal, it should be understood that, in this example or any other example, a faulty output signal is anything other than the correct output signal.

The plurality of correct and the one faulty output signals are provided to the voter 1 which performs a hard voting algorithm. In this example the hard voting algorithm determines a difference between each of the output signals 5 and defines a difference threshold based on the determined difference; determines if any one of the output signals 5 exceeds the difference threshold, and if a determination is made then identifies the respective output signal 5 as a different output signal; disregards any different output signals; and selects any one of the output signals that are not disregarded as the control signal 12. The hard voting algorithm may be useful for an SEU error, but other examples of voting algorithms are described below.

In other examples the hard voting algorithm identifies the most different output signal, disregards the most different output and selects one of the remaining outputs as the control signal 12.

As can be seen in FIG. 3, the control signal 12 remains steady after 0.5 seconds, despite the faulty output signal 305 falling to zero. The plant feedback signal 9 is unaffected.

From 0.5 seconds onwards, the faulty output signal 305 begins to converge back to the correct output signal. This is because the feedback processor 13 is configured to receive the output signal 305 from the faulty controller 3. The feedback processor 13 determines and provides the feedback control signal 11, as described above, to the combinator 14. At this time, the feedback control signal 11 is considerably different to the plant feedback signal 9, and as a result the combination algorithm causes the input signal 4 to change. Thus, the combinator 14 begins to correct the error in the faulty output signal 305 by altering the input signal 4 provided to the controller 3. Within 3 seconds, the output signal 305 from the faulty controller has returned to a correct output signal. Thus, the error within the controller 3 has cleared. This is in contrast to conventional systems, where the error may remain within the controller 3 following the SEU.

In this manner, the controller 3 and the feedback controller 6 form a feedback loop within the control block 2. The feedback loop is able to correct an error in the controller 3.

Once the error has cleared, the faulty controller 3 can continue to operate as normal, and the normal operating condition is regained. Thus, the present invention is able to correct an error in a controller 3 in real time, without causing any system down time, and offer n levels of redundancy which improve the control systems reliability.

In another exemplary embodiment, the voter 1 may perform a first soft voting algorithm. The first soft voting algorithm calculates the difference between the three output signals 5; identifies one output signal 5 which is most different from the other two output signals 5 as a different output signal; determines an arithmetic average of all of the output signals 5 excluding the different output signal; and selects the arithmetic average as the control signal 12. If all of the output signals 5 are the same or are similar, for example within 98% of each other, then the first soft voting algorithm does not identify any of the output signals 5 as different.

Figure 4:
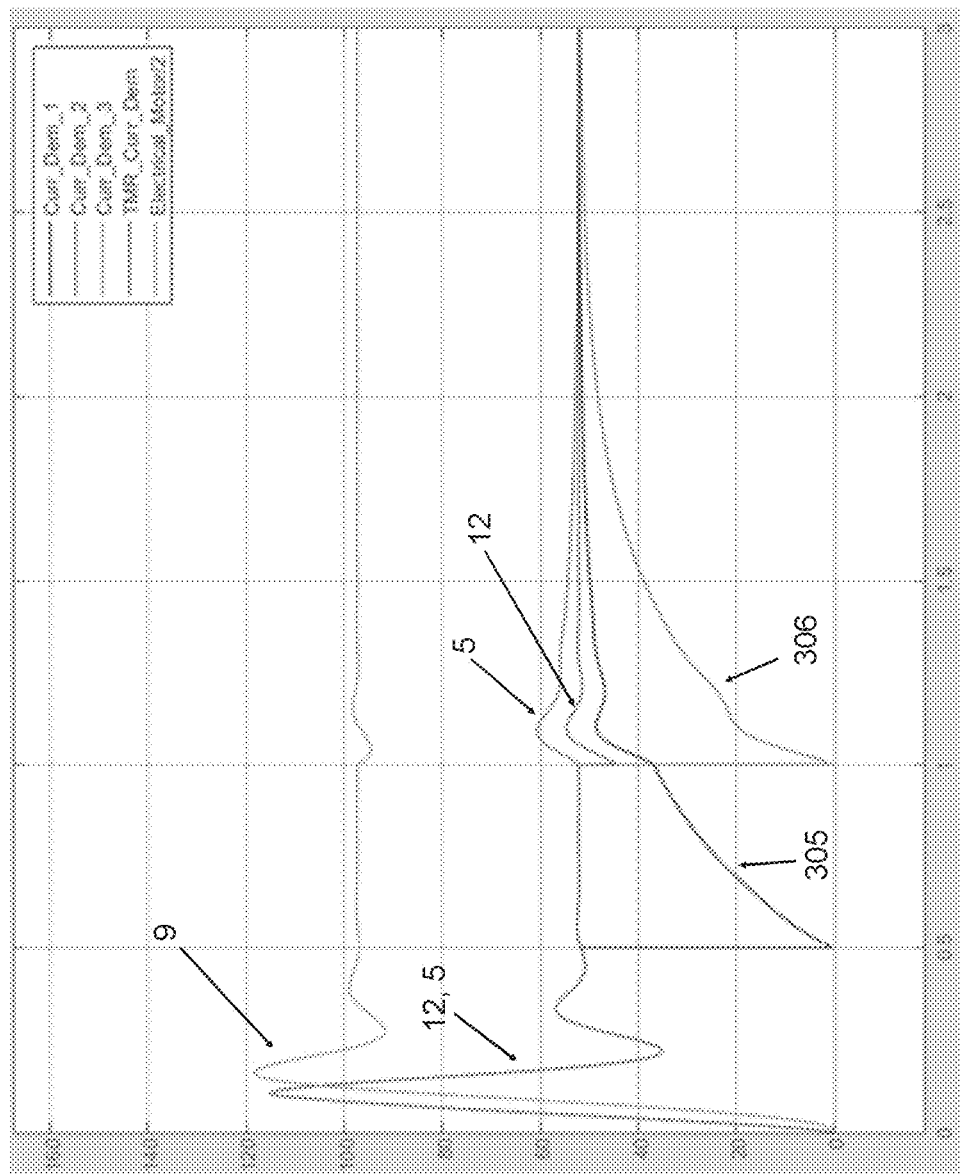
FIG. 4. is a plot showing the effect of consecutive SEUs on a voter performing a first voting algorithm, in accordance with the present invention.

FIG. 4 illustrates an example of a voter using the first soft voting algorithm, and a control system 100 which has three control blocks 2, 2n as described above. The first 0.5 seconds of the plot is the same as that described in relation to FIG. 3 above, including the occurrence of a first SEU error. In this example, during the first 0.5 seconds all the output signals 5 are identical, so the first soft voting algorithm determines an arithmetic average of the three output signals 5 and selects the arithmetic average as the control signal 12. Because each of the output signals 5 are identical, the waveforms of the output signals 5 and the control signal 12 are superimposed on one another during the first 0.5 seconds.

At 0.5 seconds the first SEU error causes the faulty output signal 305 to fall to zero. The first soft voting algorithm identifies that the faulty output signal 305 is different from the remaining output signals 5, and thus identifies it as a different output signal. The first soft voting algorithm continues determining an arithmetic average of the remaining output signals 5, and selects the arithmetic average as the control signal 12. As a result, the plant feedback signal 9 and the control signal 12 are un-affected by the first SEU error.

Between 0.5 seconds and 1.0 seconds, the faulty output signal 305 is in the process of converging back to the correct output signal 5 due to the feedback loop provided by the controller 6 described above.

At 1.0 seconds, a second SEU error occurs in a controller 3, different from the controller 3 in which the first SEU error occurred. The second SEU causes a second faulty output signal 306 to fall to zero. The occurrence of a second SEU error relatively soon after the first SEU error results in a MEU error, which can be more complicated to resolve.

At 1.0 seconds, the first soft voting algorithm identifies that the faulty output signal 306 is the most different compared to the output signal 5 and the faulty output signal 305. As a result, the arithmetic average is determined from the output signal 5 and the faulty output signal 305. The control signal 12 thus has a drop at 1.0 seconds.

The drop in the control signal 12 causes the plant feedback signal 9 to drop, which causes the combinator, in the one remaining correct control block 2, to output an increased input signal 4 to the controller 3. This results in the correct output signal 5 rising from 1.0 seconds to about 1.1 seconds. Thus, the inclusion of the converging faulty output signal 305 into the arithmetic average causes the correct output signal 5 to compensate for the error.

From 1.0 second onwards, the faulty output signal 305 continues to be corrected. As a result, the output signal 5, the faulty output signal 305 and the control signal 12 all converge towards the steady state operating condition. The faulty output signal 306 is also in the process of converging back to the correct output signal, and when it is no longer more than 98% different from the other two output signals 5, it is also re-introduced back into the arithmetic average.

In this manner, the first soft voting algorithm, and the feedback loop of the feedback processor 6 are able to correct an MEU error in real time, with minimal disturbance to the operation of the system. The first soft voting algorithm is particularly suited for control systems that have three control blocks.

In another exemplary embodiment, the voter 1 may perform a second soft voting algorithm. In this example there are three control blocks 2, 2n. The second soft voting algorithm determines a weighting for each of the output signals, wherein the weighting is a measure of the difference between the respective output signal and the remaining output signals; scales each of the output signals by their respective weighting to determine a scaled output signal for each of the output signals; determines an arithmetic average of the scaled output signals; and selects the arithmetic average as the control signal.

The following equations may be used to implement the second soft voting algorithm:

$$z = \frac{a \cdot w_a + b \cdot w_b + c \cdot w_c}{w_a + w_b + w_c} \quad \text{Equation 2}$$

$$z = a \cdot \frac{w_a}{w_a + w_b + w_c} + b \cdot \frac{w_b}{w_a + w_b + w_c} \cdot c \cdot \frac{w_c}{w_a + w_b + w_c} \quad \text{Equation 3}$$

Where z is output of the second soft voting algorithm, a, b, c are the output signals 5 provided to the voter 1, and $w_a$, $w_b$, $w_c$ are the input weights.

Each weight is calculated as a function of the differences $\Delta_{ab}$, $\Delta_{bc}$, $\Delta_{ca}$ between a, b, c. Each wait is the sum of the reciprocal distances from the associated input to the other two inputs.

$$\begin{cases} w_a = \frac{1}{\Delta_{ab}} + \frac{1}{\Delta_{ca}} \\ w_b = \frac{1}{\Delta_{ab}} + \frac{1}{\Delta_{bc}} \\ w_c = \frac{1}{\Delta_{ac}} + \frac{1}{\Delta_{bc}} \end{cases} \quad \text{Equation 4}$$

The distances have a lower limit ε to avoid division by zero in the equations above.

$$\Delta_{ab} = \begin{cases} |a-b| & \text{if } |a-b| > \epsilon \\ \epsilon & \text{if } |a-b| \leq \epsilon \end{cases} \quad \text{Equation 5}$$

$$\Delta_{bc} = \begin{cases} |b-c| & \text{if } |b-c| > \epsilon \\ \epsilon & \text{if } |b-c| \leq \epsilon \end{cases}$$

$$\Delta_{ca} = \begin{cases} |c-a| & \text{if } |c-a| > \epsilon \\ \epsilon & \text{if } |c-a| \leq \epsilon \end{cases}$$

Figure 5:
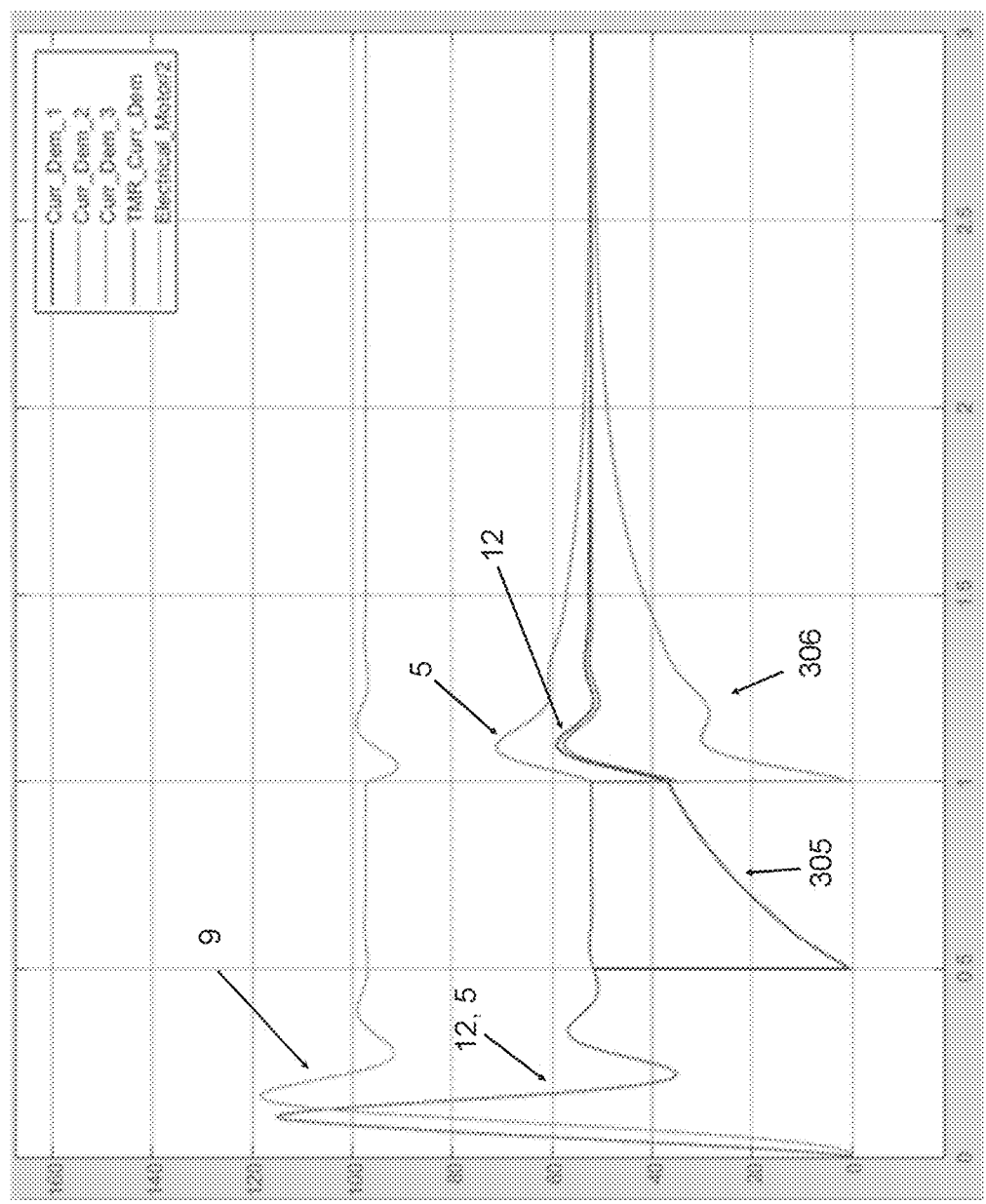
FIG. 5 is a plot showing the effect of consecutive SEUs on a voter performing a second voting algorithm, in accordance with the present invention.

FIG. 5 illustrates an example of a voter using the second soft voting algorithm on a control system 100 which has three control blocks 2, 2n. The first 0.5 seconds of the plot is the same as that described in relation to FIG. 3 and FIG. 4 above, including the occurrence of a first SEU error. In this example, during the first 0.5 seconds the second soft voting algorithm identifies that all the output signals 5 are identical and thus provides them with equal weighting and scaling, determines an arithmetic average of the output signals, and selects the arithmetic average as the control signal 12. Because each of the output signals 5 are identical, the waveforms of the output signals 5 and the control signal 12 are superimposed on one another during the first 0.5 seconds.

At 0.5 seconds the first SEU occurs which causes a faulty output signal 305 to fall to zero. The weighting of this signal is substantially reduced to close to zero and as a result it is effectively disregarded when determining the arithmetic average.

From 0.5 seconds to 1.0 second the faulty output signal 305 converges to the correct output signal because of the feedback processor 6, and is slowly re-introduced into the arithmetic average (due to an increase in its weighting as it converges).

At 1.0 seconds a second SEU occurs resulting in an MEU as described above in relation to FIG. 4. The second SEU causes a second faulty output signal 306 to fall to zero. At 1.0 seconds the difference between the output signal 5, and the faulty output signals 305, 306 results in the weighting and scaling being distributed more greatly. As a result, the control signal 12 and the plant feedback signal 9 fall at 1.0 seconds.

As described in relation to FIG. 4, from 1.0 second onward the correct output signal 5 compensates for the fall in the plant feedback signal 9. From 1.0 second onward, the feedback processor 6 begins correcting the faulty output signal 306 in the manner described above. As a result, from 1.0 second onward, the output signal 5 and faulty output signals 305, 306 converge toward the correct output signal.

In this example, three control blocks are used. However, the second soft voting algorithm would be equally or more suited to a greater number of control blocks, for example five control blocks. This is because the weighting feature of this algorithm may become more effective as the number of control blocks increases.

In this manner, the second soft voting algorithm, and the feedback loop of the feedback processor 6 are able to correct an MEU error in real time, with minimal disturbance to the operation of the system. The disturbance to the operation of the system can effectively be reduced to zero if five or more control blocks are used.

The present invention is also advantageous because, despite the control system 100 not knowing which of the control blocks 2, 2n contain the error, the present invention is able to identify and resolve the error in real time, without significantly affecting the external plant operation.

In another exemplary embodiment, a multi-stage triple modular redundancy control system 200 is shown in FIG. 2. Each of the control blocks 2a, 2b in the control systems 201, 202 work in the same way as the control blocks 2, 2n described above. Each of the voters 204a, 204b, 208 work in the same way as the voter 1 described above, and may use any one of the hard or soft voting algorithms also described above.

In this example, the external plant 210 is a DC motor which includes an inverter. The control system 201 controls a first plant parameter which is speed. The control system 202 controls a second plant parameter which is current.

The multi-stage control system 200 described above and shown in FIG. 2 therefore also offers the same advantages as those advantages described in relation to the hard and first soft and second soft voting algorithms, and the feedback processor 6. In particular, the multi-stage control system 200 is able to achieve triple modular redundancy whilst being able to identify and correct a faulty output signal in any one of the control blocks, or two of the control blocks in an MEU scenario, in real time without significantly effecting the operation of the external plant.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A control system for an aerospace vehicle, the control system comprising:
 a voter; and
 a plurality of control blocks, wherein each of the control blocks comprises:
  a controller configured to receive an input signal and perform a control algorithm comprising an integral function on the input signal to provide an output signal; and
  a feedback controller configured to:
   receive the output signal from the controller, a reference signal from an external controller, and a plant feedback signal from an external plant;
   perform a feedback algorithm on the output signal to provide a feedback control signal; and
   perform a combinator algorithm using the reference signal, the plant feedback signal and the feedback control signal to provide the input signal to the controller;
  wherein the voter is configured to receive the output signals and perform a voting algorithm on the output signals to determine a control signal to provide to the external plant.

2. The control system of claim 1, wherein the combinator algorithm comprises subtracting the feedback control signal and the plant feedback signal from the reference signal.

3. The control system of claim 1, wherein the control algorithm further comprises a proportional and/or derivative function.

4. The control system of claim 1, wherein the feedback algorithm further comprises a proportional function and/or a gain function.

5. The control system of claim 4, wherein the magnitude of the gain is less than 1.

6. The control system of claim 1, wherein the feedback controller comprises a feedback processor configured to perform the feedback algorithm.

7. The control system of claim 1, wherein the feedback controller comprises a combinator configured to perform the combinator algorithm.

8. The control system of claim 1, wherein the plurality of control blocks comprise three or more control blocks.

9. The control system of claim 1, wherein the voting algorithm comprises:
   calculating the difference between the output signals;
   identifying one output signal which is most different from the other two output signals as a different output signal;
   determining an arithmetic average of all of the output signals excluding the different output signal; and
   selecting the arithmetic average as the control signal.

10. The control system of claim 1, wherein the voting algorithm comprises:
    determining a weighting for each of the output signals, wherein the weighting is a measure of the difference between the respective output signal and the remaining output signals;
    scaling each of the output signals by their respective weighting to determine a scaled output signal for each of the output signals;
    determining an arithmetic average of the scaled output signals; and
    selecting the arithmetic average as the control signal.

11. A multi-stage control system for controlling a plant of an aerospace vehicle, the multi-stage control system comprising:
    a first and a second control system according to claim 1;
    wherein the first control system is configured to control a first parameter of the plant, and the second control system is configured to control a second parameter of the plant;
    wherein the control signal provided by the first control system is the reference signal provided to the second control system;
    wherein the first control system has a first plant feedback signal which is related to the first parameter of the plant; and
    wherein the second control system has a second plant feedback signal which is related to the second parameter of the plant.

12. The control system of claim 1, further comprising a plurality of voters; and
    an additional voter, wherein the additional voter is configured to receive the control signal output from the plurality of voters, and perform the voting algorithm on the control signals to provide a final control signal to the external plant.

13. An aerospace vehicle comprising:
    a plant;
    a controller; and
    a control system according to claim 1.

14. The aerospace vehicle of claim 13, wherein
    the plant is an actuator for any one of: an aileron, a rudder, a flap or an external control surface; or
    the plant is a heater for an internal heating system, an external heating system, a de-icing system; or
    the plant is a motor.

15. A method of controlling an aerospace vehicle using a control system comprising a plurality of control blocks and a voter, the method comprising:
    providing a reference signal from an external controller to each of the control blocks;
    providing a plant feedback signal from an external plant to each of the control blocks;
    performing in each control block:
        a control algorithm comprising an integral function on an input signal to provide an output signal;
        a feedback algorithm on the output signal to provide a feedback control signal; and
        a combinator algorithm using the reference signal, the plant feedback signal and the feedback control signal to provide the input signal;
    the voter receiving the output signals and performing a voting algorithm on the output signals to determine a control signal to provide to the external plant.

* * * * *